United States Patent
Bai

(10) Patent No.: US 9,236,959 B2
(45) Date of Patent: Jan. 12, 2016

(54) METHOD AND SYSTEM FOR TESTING ISOTROPIC SENSITIVITY OF A TERMINAL

(71) Applicant: HUIZHOU TCL MOBILE COMMUNICATION CO., LTD., Huizhou, Guangdong (CN)

(72) Inventor: Jian Bai, Huizhou (CN)

(73) Assignee: Huizhou TCL Mobile Communication Co., Ltd., Huizhou (CN)

( * ) Notice: Subject to any disclaimer, the term of this patent is extended or adjusted under 35 U.S.C. 154(b) by 0 days.

(21) Appl. No.: 14/433,219

(22) PCT Filed: Aug. 20, 2013

(86) PCT No.: PCT/CN2013/081893
§ 371 (c)(1),
(2) Date: Apr. 2, 2015

(87) PCT Pub. No.: WO2014/190626
PCT Pub. Date: Dec. 4, 2014

(65) Prior Publication Data
US 2015/0263815 A1 Sep. 17, 2015

(30) Foreign Application Priority Data
May 28, 2013 (CN) .......................... 2013 1 0205601

(51) Int. Cl.
*H04B 17/02* (2006.01)
*H04B 17/10* (2015.01)
*H04B 17/318* (2015.01)
*H04B 7/10* (2006.01)
*H04B 17/29* (2015.01)
*H04W 88/02* (2009.01)

(52) U.S. Cl.
CPC ................ *H04B 17/102* (2015.01); *H04B 7/10* (2013.01); *H04B 17/29* (2015.01); *H04B 17/318* (2015.01); *H04W 88/02* (2013.01)

(58) Field of Classification Search
CPC ........................................... H04B 7/10
USPC .................. 455/67.11, 67.12, 67.14
See application file for complete search history.

(56) References Cited

U.S. PATENT DOCUMENTS 7,873,339 B2 * 1/2011 Qi et al. ..................... 455/226.2
8,761,684 B2 * 6/2014 Reed ........................... 455/67.11

FOREIGN PATENT DOCUMENTS

| CN | 101510806 | 8/2009 |
| CN | 102185950 | 9/2011 |
| EP | 2003800 | 12/2008 |

OTHER PUBLICATIONS

English Abstract of CN101510806.
English Abstract of CN102185950.

* cited by examiner

*Primary Examiner* — Tuan H Nguyen
(74) *Attorney, Agent, or Firm* — Ladas & Parry LLP

(57) ABSTRACT

Disclosed are a method and system for testing the isotropic sensitivity of a terminal, comprising: testing the received signal strength of a terminal at every theta/phi angle and antenna polarization direction, and generating a received signal strength pattern and a table of the correspondence between base station power and the received signal strength of the terminal; finding the best theta/phi angle and antenna polarization direction and testing the corresponding effective isotropic sensitivity; calculating the effective isotropic sensitivity at other theta/phi angles and polarization directions and integrating these to obtain the isotropic sensitivity of the terminal. The present invention thereby effectively reduces testing time and improves testing efficiency.

13 Claims, 2 Drawing Sheets

METHOD AND SYSTEM FOR TESTING ISOTROPIC SENSITIVITY OF A TERMINAL

RELATED APPLICATION

This application is a national phase entry under 35 USC 371 of International Patent Application No PCT/CN2013/081893 filed on 20 Aug. 2013, which claims priority from Chinese Patent Application No. 201310205601.1 flied on 28 May 2013, the disclosures of which are incorporated in their entirety by reference herein.

FIELD OF THE INVENTION

The present disclosure generally relates to the technical field of communications, and more particularly, to a method and a system for testing Total Isotropic Sensitivity (TIS) of a terminal.

BACKGROUND OF THE INVENTION

In a system for testing a terminal antenna, the Theta angle of a rotating table for testing needs to change from 0° to 180° at a step size of 30° (6 steps in total); and the Phi angle of the rotating table needs to change from 0° to 360° at a step size of 30° (12 steps in total). Furthermore, a horizontal polarization direction and a vertical polarization direction are used for a measuring antenna in the standard darkroom, so the total number of testing points are 6*12*2=144.

At each testing point, the testing system gradually decreases the transmitting power of the base station simulator, and then transmits data packets having a fixed length but random contents. After receiving these data packets, the terminal transmits these data packets back to a base station simulator via a transmitting path. The base station simulator compares each bit of the data packets that are transmitted with the data packets that are received so as to calculate a bit error rate (BER) until the BER exceeds a standard threshold. Then, the transmitting power of the base station simulator when the BER exceeds the standard threshold is just the Effective Isotropic Sensitivity (EIS) of the current testing point. According to the 3GPP (The $3^{rd}$ Generation Partnership Project) standard, for example, the BER standard threshold is 2.44% for GSM (Global System of Mobile communication) and 0.1% for WCDMA (Wideband Code Division Multiple Access).

After the EIS of each of the testing points has been obtained, the path loss (which is a fixed deviation value for a fixed frequency point and a fixed polarization direction of the measuring antenna in the darkroom) in the darkroom is compensated for the EISs. Then, an integration operation is made according to a formula to obtain the final Total Isotropic Sensitivity (TIS).

Because the same operations are executed for each of the testing points, the time consumed in this step determines the final testing time of the whole system. Taking a standard WCDMA TIS test as an example, one BER test has to use 41 data blocks and 82 WCDMA data frames, and takes 82*10 ms=0.82 s. Averagely, 20 searches have to be made for one point, which takes 16.4 s. Therefore, a conventional 3-channel WCDMA TIS needs to take a time of about 16.4*144*3=118 minutes. Accordingly, the EIS searching time in the system for testing a terminal antenna of the prior art is relatively long, which leads to a low testing efficiency.

SUMMARY OF THE INVENTION

A technical problem to be solved in the present disclosure is to provide a method and a system for testing Total Isotropic Sensitivity (TIS) of a terminal, which take a short testing time and have a high testing efficiency.

To solve the aforesaid technical problem, the present disclosure provides a method for testing TIS of a terminal, which comprises:

placing the terminal on a rotating table in a darkroom to create a communication connection with a base station simulator via a darkroom measuring antenna;

rotating the rotating table to test a terminal received signal strength of the terminal at each Theta/Phi angle and in each antenna polarization direction and to generate a terminal received signal strength direction map:

generating a correspondence table between base station power levels and the terminal received signal strengths;

searching for the best Theta/Phi angle and the best antenna polarization direction according to the terminal received signal strength direction map, and rotating the terminal to the best Theta/Phi angle and the best antenna polarization direction to test an Effective Isotropic Sensitivity (EIS) $EIS_{best}$ of all channels under test at the best Theta/Phi angle and in the best antenna polarization direction;

calculating EISs at other Theta/Phi angles and in other antenna polarization directions according to the EIS $EIS_{best}$ and the correspondence table:

$EIS=EIS_{best}+(RXLEVEL_{best}-RXLEVEL)$; where, $RXLEVEL_{best}$ is a terminal received signal strength at the best Theta/Phi angle and in the best antenna polarization direction, and RXLEVEL is the terminal received signal strength at the other Theta/Phi angles and in other antenna polarization directions; and integrating all the EISs to obtain the terminal TIS.

The correspondence table is obtained by testing the base station power levels and the terminal received signal strengths, or is generated by means of an Equal Difference method in which as the base station signal strength decreases by per 1 dB, the terminal received signal strength also decreases by 1 dB.

The step of rotating the rotating table to test a terminal received signal strength of the terminal at each Theta/Phi angle and in each antenna polarization direction and to generate a terminal received signal strength direction map comprises:

rotating the rotating table to move the terminal sequentially to different Theta and Phi angles and adjusting the polarization direction of the antenna;

testing the terminal received signal strength at each of the Theta/Phi angles and in each of the antenna polarization directions; and forming the terminal received signal strength direction map according to all the terminal received signal strengths.

In the step of testing the terminal received signal strength at each of the Theta/Phi angles and in each of the antenna polarization directions, the terminal received signal strength is tested at least twice or the terminal received signal strength at different base station power levels are tested, and then the results are averaged.

The step of generating a terminal received signal strength direction map further comprises:

searching for the best Phi angle and the best antenna polarization direction at each of the Theta angles;

re-testing the terminal received signal strength at the best Phi angle and in the best antenna polarization direction, and comparing the terminal received signal strength obtained with the received signal strength in the terminal received signal strength direction map to obtain a difference value; and correcting the terminal received signal strengths at the Theta angle corresponding to all the Phi angles and all the antenna polarization directions according to the difference value.

The present disclosure further provides a system for testing TIS of a terminal, which comprises the terminal, a base station simulator, a darkroom and a controller, and the darkroom comprising a measuring antenna and a rotating table, wherein:

the terminal is placed on the rotating table in the darkroom to create a communication connection with the base station simulator via the measuring antenna;

the rotating table is rotated to different Theta/Phi angles and antenna polarization directions so that the controller tests a terminal received signal strength of the terminal at each of the Theta/Phi angles and in each of the antenna polarization directions and generates a terminal received signal strength direction map;

the controller generates a correspondence table between base station power levels and the terminal received signal strengths;

the controller searches for the best Theta/Phi angle and the best antenna polarization direction according to the terminal received signal strength direction map, and rotates the terminal to the best Theta/Phi angle and the best antenna polarization direction to test an EIS $EIS_{best}$ of all channels under test at the best Theta/Phi angle and in the best antenna polarization direction;

the controller calculates EISs at other Theta/Phi angles and in other antenna polarization directions according to the EIS $EIS_{best}$ and the correspondence table: $EIS=EIS_{best}+(RXLEVEL_{best}-RXLEVEL)$; where, $RXLEVEL_{best}$ is a terminal received signal strength at the best Theta/Phi angle and in the best antenna polarization direction, and RXLEVEL is the terminal received signal strength at the other Theta/Phi angles and in other antenna polarization directions; and the controller integrates all the EISs to obtain the terminal TIS.

The controller obtains the correspondence table by testing the base station power levels and the terminal received signal strengths, or adopts an Equal Difference method, in which as the base station signal strength decreases by per 1 dB, the terminal received signal strength also decreases by 1 dB, to generate the correspondence table.

The rotating table is rotated to move the terminal sequentially to different Theta and Phi angles and to adjust the polarization direction of the antenna, and the controller tests the terminal received signal strength at each of the Theta/Phi angles and in each of the antenna polarization directions and forms the terminal received signal strength direction map according to all the terminal received signal strengths.

The controller tests the terminal received signal strength at least twice or tests the terminal received signal strength at different base station power levels, and then averages the results.

At each of the Theta angles, the controller searches for the best Phi angle and the best antenna polarization direction, re-tests the terminal received signal strength at the best Phi angle and in the best antenna polarization direction, and compares the terminal received signal strength obtained with the terminal received signal strength in the terminal received signal strength direction map to obtain a difference value; and The controller corrects the terminal received signal strengths at the Theta angle corresponding to all the Phi angles and all the antenna polarization directions according to the difference value.

To solve the aforesaid technical problem, the present disclosure further provides a method for testing TIS of a terminal, which comprises: placing the terminal on a rotating table in a darkroom to create a communication connection with a base station simulator via a darkroom measuring antenna; rotating the rotating table to test a terminal received signal strength of the terminal at each Theta/Phi angle and in each antenna polarization direction and to generate a terminal received signal strength direction map, which comprises: rotating the rotating table to move the terminal sequentially to different Theta and Phi angles and adjusting the polarization direction of the antenna; testing the terminal received signal strength at each of the Theta/Phi angles and in each of the antenna polarization directions; and forming the terminal received signal strength direction map according to all the terminal received signal strengths; generating a correspondence table between base station power levels and the terminal received signal strengths; searching for the best Theta/Phi angle and the best antenna polarization direction according to the terminal received signal strength direction map, and rotating the terminal to the best Theta/Phi angle and the best antenna polarization direction to test an EIS $EIS_{best}$ of all channels under test at the best Theta/Phi angle and in the best antenna polarization direction; calculating EISs at other Theta/Phi angles and in other antenna polarization directions according to the EIS $EIS_{best}$ and the correspondence table: $EIS=EIS_{best}+(RXLEVEL_{best}-RXLEVEL)$; where, $RXLEVEL_{best}$ is a terminal received signal strength at the best Theta/Phi angle and in the best antenna polarization direction, and RXLEVEL is the terminal received signal strength at the other Theta/Phi angles and in other antenna polarization directions; and integrating all the EISs to obtain the terminal TIS; wherein the correspondence table is obtained by testing the base station power levels and the terminal received signal strengths, or is generated by means of an Equal Difference method in which as the base station signal strength decreases by per 1 dB, the terminal received signal strength also decreases by 1 dB.

In the step of testing the terminal received signal strength at each of the Theta/Phi angles and in each of the antenna polarization directions, the terminal received signal strength is tested at least twice or the terminal received signal strength at different base station power levels are tested, and then the results are averaged.

The step of generating a terminal received signal strength direction map comprises: searching for the best Phi angle and the best antenna polarization direction at each of the Theta angles; re-testing the terminal received signal strength at the best Phi angle and in the best antenna polarization direction, and comparing the terminal received signal strength obtained with the terminal received signal strength in the terminal received signal strength direction map to obtain a difference value; and correcting the terminal received signal strengths at the Theta angle corresponding to all the Phi angles and all the antenna polarization directions according to the difference value.

Through the above solutions, the present disclosure provides the following benefits: by testing a terminal received signal strength at each Theta/Phi angle and in each antenna polarization direction and generating a terminal received signal strength direction map and a correspondence table between base station power levels and the terminal received signal strengths, the best Theta/Phi angle and the best antenna polarization direction are found and an EIS corresponding to the best Theta/Phi angle and the best antenna polarization direction is tested, and then EISs at other Theta/Phi angles and in other antenna polarization directions are calculated and integrated to obtain the terminal TIS. Thereby, the testing time can be effectively reduced and the testing efficiency can be improved.

DETAILED DESCRIPTION OF THE INVENTION

Figure 1:
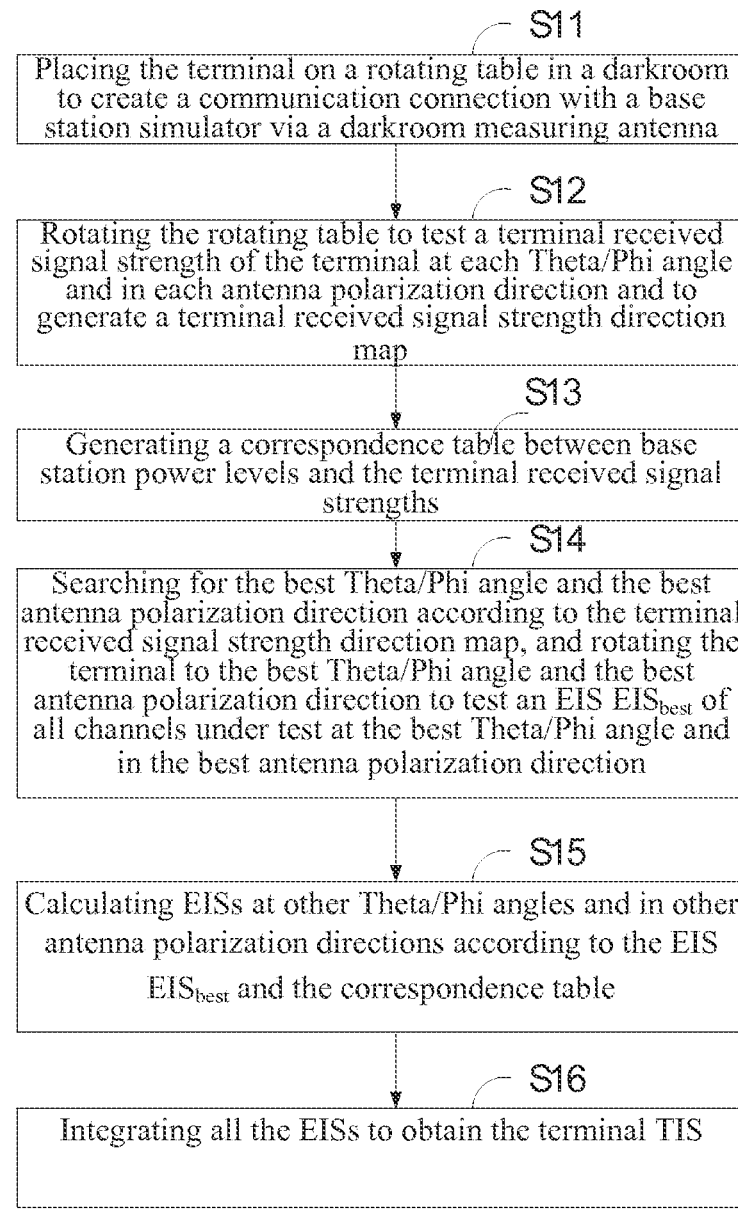
FIG. 1 is a schematic flowchart diagram of a first embodiment of a method for testing TIS of a terminal according to the present disclosure.

Referring to FIG. 1, there is shown a schematic flowchart diagram of a first embodiment of a method for testing TIS of a terminal according to the present disclosure. As shown in FIG. 1, the present disclosure provides a method for testing TIS of a terminal, which comprises:

Step S11: placing the terminal on a rotating table in a darkroom to create a communication connection with a base station simulator via a darkroom measuring antenna.

Figure 2:
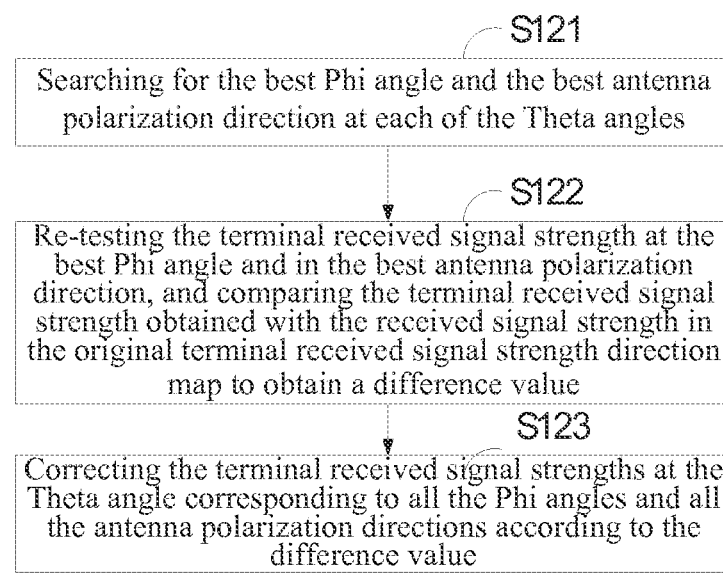
FIG. 2 is a schematic view illustrating a sub-process of step S12 shown in FIG. 1 according to the present disclosure.

Step S12: rotating the rotating table to test a terminal received signal strength of the terminal at each Theta/Phi angle and in each antenna polarization direction and to generate a terminal received signal strength direction map. At each of the Theta/Phi angles, two measurements need to be made by adjusting the polarization direction of the measuring antenna into the horizontal polarization and the vertical polarization respectively. One Theta/Phi angle and one antenna polarization direction form a testing point, and a base station simulator is maintained at a fixed signal strength, so the terminal received signal strength is tested only once at each testing point. The power level of the base station simulator is denoted by InitialCellPower. In other embodiments of the present disclosure, the terminal received signal strength is tested at least twice at each testing point or the terminal received signal strengths are tested at different base station power levels, and then the results are averaged as the terminal received signal strength of the testing point; and the number of times of the testing may be but is not limited to two. Preferably, the power level of the base station simulator is InitialCellPower in one test, the power level of the base station simulator is InitialCellPower−0.5 in the other test, and the two results obtained are averaged as the terminal received signal strength of the testing point, and this may increase the resolution of the terminal received signal strength from 1 dB to 0.5 dB. The InitialCellPower set forth herein may be but is not limited to a relatively high signal strength, and is preferably −40 dBm. For example, if the base station power level in the first test is −15 dBm, then the strength obtained after the test is 40. In the second test, the base station power level is set to be −15.5 dBm, and if the strength obtained after the testing is still 40, then the final testing value is 40.5; and otherwise, is 40. In this way, the original testing error of 1 dB may be corrected to 0.5 dB. If the number of times of the tests is increased at an interval of 0.25, then the testing error is also changed to 0.25 dB correspondingly. Each test only takes 4 s. After the tests at all the testing points are completed, the terminal received signal strength direction map is formed according to all the terminal received signal strengths. In a preferred embodiment, the terminal received signal strength direction map is saved so as to be called when needed, which can further reduce the testing time. The terminal received signal strength direction map may be saved as one file, but is not limited thereto. If the terminal received signal strength direction map needs to be called when other terminals continue to be tested, the following method may be used to make corrections to increase the accuracy of the testing so that the result can become more stable. As shown in FIG. 2, there is shown a schematic view illustrating a sub-process of step S12 shown in FIG. 1 according to the present disclosure. The step S12 comprises:

Step S121: searching for the best Phi angle and the best antenna polarization direction at each of the Theta angles.

Step S122: re-testing the terminal received signal strength at the best Phi angle and in the best antenna polarization direction, and comparing the terminal received signal strength obtained with the received signal strength in the original terminal received signal strength direction map to obtain a difference value.

Step S123: correcting the terminal received signal strengths at the Theta angle corresponding to all the Phi angles and all the antenna polarization directions according to the difference value.

For a communication frequency band, the TIS or terminal received signal strength direction map is basically the same for each of the channels, so it is sufficient to test the terminal received signal strength direction map of only one of the channels without having to test the terminal received signal strength direction map of each channel. Preferably, if there are three channels (i.e., a high channel, a medium channel, and a low channel) to be tested, then it is sufficient to test the terminal received signal strength direction map of only the medium channel.

Step S13: generating a correspondence table between base station power levels and the terminal received signal strengths. The correspondence table may be obtained by testing the base station power levels and the terminal received signal strengths, or by means of an Equal Difference method in which as the base station signal strength decreases by per 1 dB, the terminal received signal strength also decreases by 1 dB.

Step S14: searching for the best Theta/Phi angle and the best antenna polarization direction according to the terminal received signal strength direction map, and rotating the terminal to the best Theta/Phi angle and the best antenna polarization direction to test an EIS $EIS_{best}$ of all channels under test at the best Theta/Phi angle and in the best antenna polarization direction. The path loss in the darkroom needs to be compensated for the EIS $EIS_{best}$, and is a fixed deviation value for a fixed frequency point and a fixed polarization direction of the measuring antenna. In this embodiment, the base station simulator transmits data packets to the terminal via the measuring antenna, and the terminal transmits the data packets that are received back to the base station simulator via the communication antenna. The base station simulator calculates a bit error rate (BER) according to the data packets that are transmitted and the data packets that are received to adjust the transmitting power of the base station simulator. When the BER reaches a standard threshold, the transmitting power of the base station simulator is just the EIS at the current Theta/Phi angle and in the current antenna polarization direction.

Step S15: calculating EISs at other Theta/Phi angles and in other antenna polarization directions according to the EIS $EIS_b$ and the correspondence table:

$$EIS = EIS_{best} + (RXLEVEL_{best} - RXLEVEL)$$

where, $RXLEVEL_{best}$ is a terminal received signal strength at the best Theta/Phi angle and in the best antenna polarization direction, and RXLEVEL is the terminal received signal strength at the other Theta/Phi angles and in other antenna polarization directions.

In this embodiment, it is only necessary to test the EIS $EIS_{best}$ at the best Theta/Phi angle and in the best antenna polarization direction, and the EISs at other angles and in other polarization directions are calculated from the equation according to EIS. However, in the conventional tests of the prior art, the same EIS searching operation needs to be performed on each testing point. Therefore, if the testing time of each testing point is reduced by 10 s, then the total testing time is reduced by 144*10 s=24 minutes. For a conventional 3-channel testing, the testing time is reduced by 24*3=72 minutes. Taking a conventional 3-channel WCDMA TIS test as an example, the testing time of each testing point is reduced from 3*16.4 s to 4 s, and the testing time of the whole testing is reduced from 118 minutes to about 10 minutes, so the testing efficiency is greatly improved.

Step S16: integrating all the EISs to obtain the terminal TIS.

In this embodiment, by testing the terminal received signal strength at each Theta/Phi angle and in each antenna polarization direction and generating the terminal received signal strength direction map and the correspondence table between the base station power levels and the terminal received signal strengths, searching for the best Theta/Phi angle and the best antenna polarization direction and testing the EIS corresponding to the best Theta/Phi angle and the best antenna polarization direction, and then calculating EISs at other Theta/Phi angles and in other antenna polarization directions and integrating the EISs at other Theta/Phi angles and in other antenna polarization directions to obtain the terminal TIS, the testing time can be effectively reduced and the testing efficiency can be improved.

Figure 3:
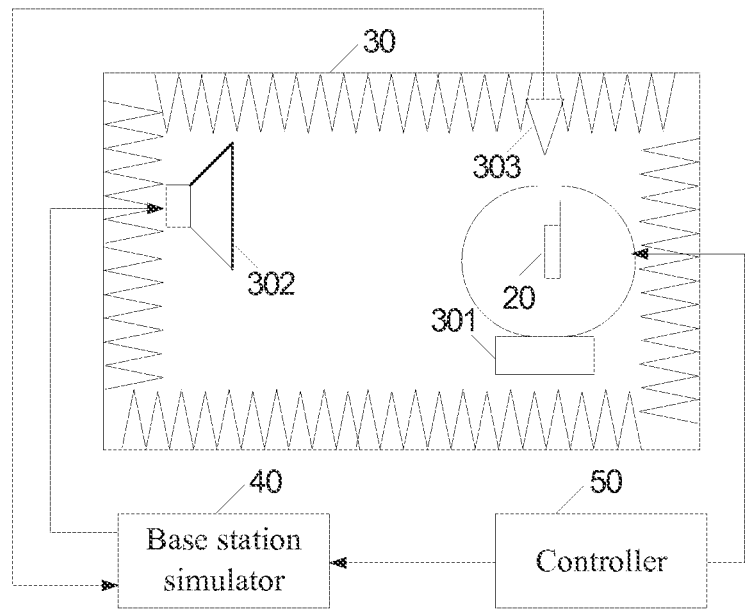
FIG. 3 is a schematic structural view of a first embodiment of a system for testing TIS of a terminal according to the present disclosure.

Referring to FIG. 3, there is shown a schematic structural view of a first embodiment of a system for testing TIS of a terminal according to the present disclosure. As shown in FIG. 3, the system for testing TIS of a terminal according to the present disclosure comprises a terminal 20, a base station simulator 40, a darkroom 30 and a controller 50; and the darkroom 30 comprises a measuring antenna 302, a communication antenna 303 and a rotating table 301.

The terminal 20 is placed on the rotating table 301 in the darkroom 30 to create a communication connection with the base station simulator 40 via the measuring antenna 302 and the communication antenna 303.

The rotating table 301 is rotated to different Theta/Phi angles and antenna polarization directions so that the controller 50 tests a terminal received signal strength of the terminal 20 at each of the Theta/Phi angles and in each of the antenna polarization directions and generates a terminal received signal strength direction map.

In this embodiment, at each of the Theta/Phi angles, two measurements need to be made by adjusting the polarization direction of the measuring antenna into the horizontal polarization and the vertical polarization respectively. One Theta/Phi angle and one antenna polarization direction form a testing point. The base station simulator 40 is maintained at a fixed signal strength, so the terminal received signal strength is tested only once at each testing point. The power level of the base station simulator 40 is denoted by InitialCellPower. In other embodiments of the present disclosure, the terminal received signal strength is tested at least twice at each testing point, or the terminal received signal strengths are tested at different base station power levels and then the results are averaged as the terminal received signal strength of the testing point; and the number of times of the testing may be but is not limited to two. Preferably, the power level of the base station simulator 40 is InitialCellPower in one test, the power level of the base station simulator 40 is InitialCellPower–0.5 in the other test, and the two results obtained are averaged as the terminal received signal strength of the testing point, and this may increase the resolution of the terminal received signal strength from 1 dB to 0.5 dB. Each test only takes 4 s. After the tests at all the testing points are completed, the terminal received signal strength direction map is formed according to all the terminal received signal strengths, and the terminal received signal strength direction map is saved so as to be called when needed, which can further reduce the testing time. The terminal received signal strength direction map may be saved as one file, but is not limited thereto.

If the terminal received signal strength direction map needs to be called when other terminals 20 continue to be tested, the controller 50 may make corrections on the terminal received signal strength direction map to increase the accuracy of the testing so that the result can become more stable. Specifically, at each of the Theta angles, the controller 50 searches for the best Phi angle and the best antenna polarization direction, re-tests the terminal received signal strength at the best Phi angle and in the best antenna polarization direction, and compares the terminal received signal strength obtained with the received signal strength in the original terminal received signal strength direction map to obtain a difference value; and the controller 50 corrects the terminal received signal strengths at the Theta angle corresponding to all the Phi angles and all the antenna polarization directions according to the difference value.

The controller 50 generates the correspondence table between the base station power levels and the terminal received signal strengths by testing the base station power levels and the terminal received signal strengths, or by means of an Equal Difference method in which as the base station signal strength decreases by per 1 dB, the terminal received signal strength also decreases by 1 dB.

The controller 50 searches for the best Theta/Phi angle and the best antenna polarization direction according to the terminal received signal strength direction map, and rotates the terminal 20 to the best Theta/Phi angle and the best antenna polarization direction to test an EIS $EIS_{best}$ of all channels under test at the best Theta/Phi angle and in the best antenna polarization direction. The path loss in the darkroom 30 needs to be compensated for the EIS $EIS_{best}$, and is a fixed deviation value for a fixed frequency point and a fixed polarization direction of the measuring antenna 302. In this embodiment, the base station simulator 40 transmits data packets to the terminal 20 via the measuring antenna 302, and the terminal 20 transmits the data packets that are received back to the base station simulator 40 via the communication antenna 30. The base station simulator 40 calculates a bit error rate (BER) according to the data packets that are transmitted and the data packets that are received to adjust the transmitting power of the base station simulator 40. When the BER reaches a standard threshold, the transmitting power of the base station simulator 40 is just the EIS at the current Theta/Phi angle and in the current antenna polarization direction.

The controller 50 calculates EISs at other Theta/Phi angles and in other antenna polarization directions according to the EIS $EIS_{best}$ and the correspondence table:

$$EIS = EIS_{best} + (RXLEVEL_{best} - RXLEVEL)$$

where, $RXLEVEL_{best}$ is a terminal received signal strength at the best Theta/Phi angle and in the best antenna polarization direction, and RXLEVEL is the terminal received signal strength at the other Theta/Phi angles and in other antenna polarization directions.

Finally, the controller 50 integrates all the EISs to obtain the terminal TIS.

In this embodiment, the controller 50 only needs to test the EIS $EIS_{best}$ at the best Theta/Phi angle and in the best antenna polarization direction, and the EISs at other angles and in other polarization directions are calculated from the equation according to the EIS. However, in the conventional tests of the prior art, the same EIS searching operation needs to be performed on each testing point. Therefore, the testing time can be effectively reduced and the testing efficiency can be improved. Taking a conventional 3-channel WCDMA TIS test as an example, the testing time of each testing point is reduced from 3*16.4 s to 4 s, and the testing time of the whole testing is reduced from 118 minutes to about 10 minutes, so the testing efficiency is greatly improved.

According to the above descriptions, by testing the terminal received signal strength at each Theta/Phi angle and in each antenna polarization direction and generating the terminal received signal strength direction map and the correspondence table between the base station power levels and the terminal received signal strengths, searching for the best Theta/Phi angle and the best antenna polarization direction and testing the EIS corresponding to the best Theta/Phi angle and the best antenna polarization direction, and then calculating EISs at other Theta/Phi angles and in other antenna polarization directions and integrating the EISs at other Theta/Phi angles and in other antenna polarization directions to obtain the terminal TIS, the testing time can be effectively reduced and the testing efficiency can be improved.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the protection scope of the present disclosure.

What is claimed is:

1. A method for testing Total Isotropic Sensitivity (TIS) of a terminal, comprising:
    placing the terminal on a rotating table in a darkroom to create a communication connection with a base station simulator via a darkroom measuring antenna;
    rotating the rotating table to test a terminal received signal strength of the terminal at each Theta/Phi angle and in each antenna polarization direction, and to generate a terminal received signal strength direction map;
    generating a correspondence table between base station power levels and the terminal received signal strengths;
    searching for the best Theta/Phi angle and the best antenna polarization direction according to the terminal received signal strength direction map, and rotating the terminal to the best Theta/Phi angle and the best antenna polarization direction to test an Effective Isotropic Sensitivity (EIS) $EIS_{best}$ of all channels under test at the best Theta/Phi angle and in the best antenna polarization direction;
    calculating EISs at other Theta/Phi angles and in other antenna polarization directions according to the EIS $EIS_{best}$ and the correspondence table:

$$EIS=EIS_{best}+(RXLEVEL_{best}-RXLEVEL)$$

where, $RXLEVEL_{best}$ is a terminal received signal strength at the best Theta/Phi angle and in the best antenna polarization direction, and RXLEVEL is the terminal received signal strength at the other Theta/Phi angles and in other antenna polarization directions; and
    integrating all the EISs to obtain the terminal TIS.

2. The method of claim 1, wherein the correspondence table is obtained by testing the base station power levels and the terminal received signal strengths, or is generated by means of an Equal Difference method in which as the base station signal strength decreases by per 1 dB, the terminal received signal strength also decreases by 1 dB.

3. The method of claim 1, wherein the step of rotating the rotating table to test a terminal received signal strength of the terminal at each Theta/Phi angle and in each antenna polarization direction and to generate a terminal received signal strength direction map comprises:
    rotating the rotating table to move the terminal sequentially to different Theta and Phi angles and adjusting the polarization direction of the antenna;
    testing the terminal received signal strength at each of the Theta/Phi angles and in each of the antenna polarization directions; and
    forming the terminal received signal strength direction map according to all the terminal received signal strengths.

4. The method of claim 3, wherein in the step of testing the terminal received signal strength at each of the Theta/Phi angles and in each of the antenna polarization directions, the terminal received signal strength is tested at least twice or the terminal received signal strength at different base station power levels are tested, and then the results are averaged.

5. The method of claim 1, wherein the step of generating a terminal received signal strength direction map further comprises:
    searching for the best Phi angle and the best antenna polarization direction at each of the Theta angles;
    re-testing the terminal received signal strength at the best Phi angle and in the best antenna polarization direction, and comparing the terminal received signal strength obtained with the terminal received signal strength in the terminal received signal strength direction map to obtain a difference value; and
    correcting the terminal received signal strengths at the Theta angle corresponding to all the Phi angles and all the antenna polarization directions according to the difference value.

6. A system for testing TIS of a terminal, the system comprising the terminal, a base station simulator, a darkroom and a controller, and the darkroom comprising a measuring antenna and a rotating table, wherein:
    the terminal is placed on the rotating table in the darkroom to create a communication connection with the base station simulator via the measuring antenna;
    the rotating table is rotated to different Theta/Phi angles and antenna polarization directions so that the controller tests a terminal received signal strength of the terminal at each of the Theta/Phi angles and in each of the antenna polarization directions and generates a terminal received signal strength direction map;
    the controller generates a correspondence table between base station power levels and the terminal received signal strengths;
    the controller searches for the best Theta/Phi angle and the best antenna polarization direction according to the terminal received signal strength direction map, and rotates the terminal to the best Theta/Phi angle and the best antenna polarization direction to test an EIS $EIS_{best}$ of all channels under test at the best Theta/Phi angle and in the best antenna polarization direction;

the controller calculates EISs at other Theta/Phi angles and in other antenna polarization directions according to the EIS $EIS_{best}$ and the correspondence table:

$$EIS=EIS_{best}+(RXLEVEL_{best}-RXLEVEL)$$

where, $RXLEVEL_{best}$ is a terminal received signal strength at the best Theta/Phi angle and in the best antenna polarization direction, and RXLEVEL is the terminal received signal strength at the other Theta/Phi angles and in other antenna polarization directions; and the controller integrates all the EISs to obtain the terminal TIS.

7. The system of claim 6, wherein the controller obtains the correspondence table by testing the base station power levels and the terminal received signal strengths, or adopts an Equal Difference method, in which as the base station signal strength decreases by per 1 dB, the terminal received signal strength also decreases by 1 dB, to generate the correspondence table.

8. The system of claim 6, wherein the rotating table is rotated to move the terminal sequentially to different Theta and Phi angles and to adjust the polarization direction of the antenna, and the controller tests the terminal received signal strength at each of the Theta/Phi angles and in each of the antenna polarization directions and forms the terminal received signal strength direction map according to all the terminal received signal strengths.

9. The system of claim 8, wherein the controller tests the terminal received signal strength at least twice or tests the terminal received signal strength at different base station power levels, and then averages the results.

10. The system of claim 6, wherein, at each of the Theta angles, the controller searches for the best Phi angle and the best antenna polarization direction, re-tests the terminal received signal strength at the best Phi angle and in the best antenna polarization direction, and compares the terminal received signal strength obtained with the terminal received signal strength in the terminal received signal strength direction map to obtain a difference value; and the controller corrects the terminal received signal strengths at the Theta angle corresponding to all the Phi angles and all the antenna polarization directions according to the difference value.

11. A method for testing TIS of a terminal, comprising:
placing the terminal on a rotating table in a darkroom to create a communication connection with a base station simulator via a darkroom measuring antenna;
rotating the rotating table to test a terminal received signal strength of the terminal at each Theta/Phi angle and in each antenna polarization direction and to generate a terminal received signal strength direction map, which comprises: rotating the rotating table to move the terminal sequentially to different Theta and Phi angles and adjusting the polarization direction of the antenna; testing the terminal received signal strength at each of the Theta/Phi angles and in each of the antenna polarization directions; and forming the terminal received signal strength direction map according to all the terminal received signal strengths;

generating a correspondence table between base station power levels and the terminal received signal strengths;

searching for the best Theta/Phi angle and the best antenna polarization direction according to the terminal received signal strength direction map, and rotating the terminal to the best Theta/Phi angle and the best antenna polarization direction to test an EIS $EIS_{best}$ of all channels under test at the best Theta/Phi angle and in the best antenna polarization direction;

calculating EISs at other Theta/Phi angles and in other antenna polarization directions according to the EIS $EIS_{best}$ and the correspondence table:

$$EIS=EIS_{best}+(RXLEVEL_{best}-RXLEVEL)$$

where, $RXLEVEL_{best}$ is a terminal received signal strength at the best Theta/Phi angle and in the best antenna polarization direction, and RXLEVEL is the terminal received signal strength at the other Theta/Phi angles and in other antenna polarization directions; and integrating all the EISs to obtain the terminal TIS,
wherein the correspondence table is obtained by testing the base station power levels and the terminal received signal strengths, or is generated by means of an Equal Difference method in which as the base station signal strength decreases by per 1 dB, the terminal received signal strength also decreases by 1 dB.

12. The method of claim 11, wherein in the step of testing the terminal received signal strength at each of the Theta/Phi angles and in each of the antenna polarization directions, the terminal received signal strength is tested at least twice or the terminal received signal strength at different base station power levels are tested, and then the results are averaged.

13. The method of claim 11, wherein the step of generating a terminal received signal strength direction map further comprises:

searching for the best Phi angle and the best antenna polarization direction at each of the Theta angles;

re-testing the terminal received signal strength at the best Phi angle and in the best antenna polarization direction, and comparing the terminal received signal strength obtained with the terminal received signal strength in the terminal received signal strength direction map to obtain a difference value; and correcting the terminal received signal strengths at the Theta angle corresponding to all the Phi angles and all the antenna polarization directions according to the difference value.

* * * * *